Figure 1:
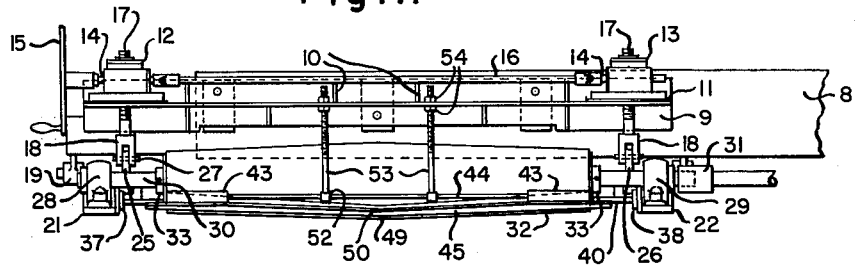

Nov. 13, 1962  S. O. PERRINE  3,063,713
DEFLECTOR MEANS FOR SHEET HANDLING APPARATUS
Filed Nov. 19, 1959

INVENTOR
Sterling O. Perrine

United States Patent Office 3,063,713
Patented Nov. 13, 1962

3,063,713
DEFLECTOR MEANS FOR SHEET HANDLING APPARATUS
Sterling O. Perrine, Warren, Ohio, assignor to The Wean Engineering Company, Inc., Warren, Ohio
Filed Nov. 19, 1959, Ser. No. 854,036
10 Claims. (Cl. 271—69)

This invention relates to sheet handling apparatus in which sheets are moved along a succession of conveyor means and are transferred successively from one conveyor to another succeeding conveyor.

This invention is particularly useful where paramagnetic sheets are moved along a succession of belt conveyors, the sheets being carried by the conveyors and transferred successively from one conveyor to the next. Frequently, a succession of conveyors is employed to pile sheets which are initially in a series upon the initial conveyor. In such an arrangement the conveyors are run at successively slower speeds with the result that the sheets are overlapped one upon another and are eventually deposited in a piler in a well formed vertical pile which is usually defined by side guides. In such an arrangement, each conveyor is ordinarily placed slightly below the preceding faster moving conveyor whereby the sheets are delivered from the faster moving conveyor slightly above the lower moving conveyor. The speeds which are employed are frequently quite high. In this manner the leading edge of one sheet on the rapidly moving conveyor is projected outwardly above the next preceding sheet on the more slowly moving conveyor. The speeds which are employed are frequently quite high and the sheets acquire a high kinetic energy. Means are ordinarily employed to hold the sheets upon the conveyors. Magnets are commonly placed beneath the conveyors to draw sheets of paramagnetic material downwardly onto the conveyors. In some instances means have been placed above the conveyors above the conveyor transfer point at which sheets transfer from one conveyor to another. Apparatus of the foregoing type is frequently used in connection with shearing lines and single sheet classifiers where strip material is cut into sheets and then piled.

Conventional arrangements have been successful at lower speeds which have heretofore been the usual practice, although some operating difficulties have been encountered. In some instances such operating difficulties have limited the speed of the conveyors and the rate at which sheets can be piled. A continuing demand for greater output has made it imperative to increase the speed of sheet handling equipment. At higher speeds, which are now desired, and at which I prefer to operate sheet conveyor means, individual sheets have heretofore tended to become erratic in their behavior. For example, a number of sheets may move along the conveyors staying in close proximity to the conveyors and lapping in regular and intended manner. A series of sheets may follow which are projected outwardly from the higher speed conveyor above the lower speed conveyor in a somewhat different elevational plane than previous sheees. Such variations may be due to slight deformations of the sheets, to air currents through an open mill door, and the like. When such occurs, sheets frequently pile up with the preceding sheet, creating a "cobble" which must be dealt with by stopping the apparatus and separating the sheets by hand. I have observed that a major cause which is particularly pronounced at high speeds is that the leading edge of a sheet may be pulled downwardly to the conveyors after transfer from one conveyor to another. The trailing edge of the sheet may be slightly higher and away from the influence produced by magnetic means beneath the conveyors. In such cases, the rear edge of the sheet sometimes tends to continue traveling at a high speed, and sheets are sometimes doubled over or are folded with the trailing edge above the central portion or leading edge of the strip. In addition to creating a cobble such folding often permanently creases the sheets.

I provide deflector plate means spaced above sheet conveyor means adjacent a conveyor transfer point to which sheets are brought by first conveyor means and from which they are taken away by second conveyor means. I preferably provide magnet means urging the sheets downwardly. I preferably place the deflector means in spaced relationship above the second conveyor which carries sheets away from the transfer point. I further preferably provide magnetic roll means above the conveyor means adjacent the transfer point and preferably crown said roll means whereby the sheets are bowed and projected outwardly in stiffened form from the first conveyor above the second conveyor. I preferably provide deflector plate means positioned immediately rearwardly and slightly above the magnetic roll means. I preferably flare the corners of the leading edge of the plate-like deflector member outwardly whereby the leading edge is bowed upwardly and corresponds to the crown of said roll means. I further preferably extend the deflector plate rearwardly a substantial distance and provide an opening in the center portion of the deflector plate. I prefer that said opening be a cut-away portion of the plate member beginning on the longitudinal axis of the plate member at a point rearwardly of the leading edge and diverging rearwardly to the trailing edge of the plate-like member whereby the trailing edge of the plate-like member is substantially cut away having only the side portion thereof remaining. I preferably mount the plate-like deflector member adjacent the lower face of said roll means. I prefer to arrange said plate for vertical positioning and prefer to provide means for independently positioning the leading and trailing edges of the deflector member.

Other details, objects and advantages of my invention will become more apparent as the following description of a present preferred embodiment thereof proceeds.

Figure 3:
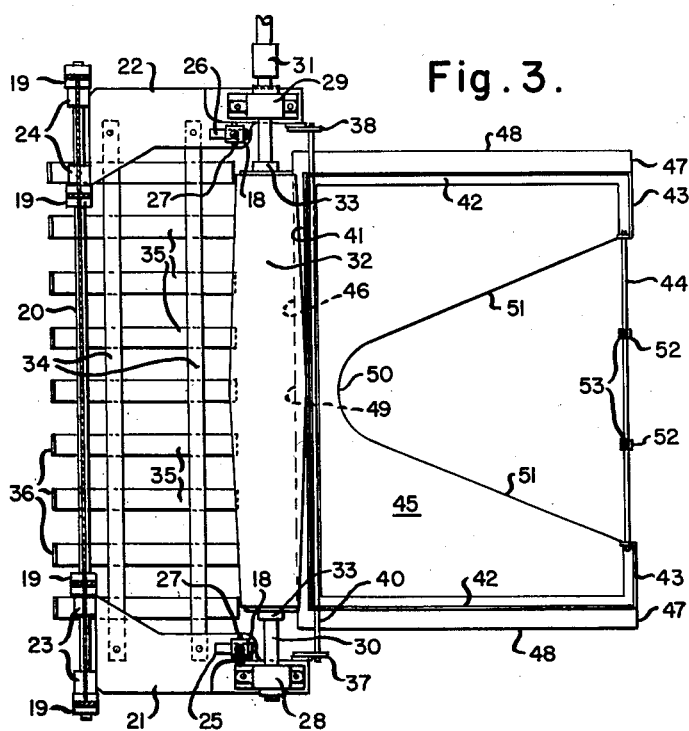
Figure 2:
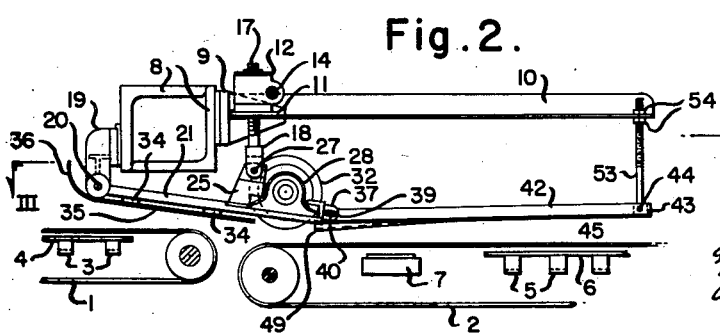

In the accompanying drawings, I have illustrated a present preferred embodiment of my invention in which FIGURE 1 is an end view of deflector plate apparatus embodying my invention;

FIGURE 2 is a side view of the deflector plate shown in FIGURE 1, and illustrates a pair of sheet conveyor belts; and, FIGURE 3 is a sectional view of the deflector plate apparatus taken along line III—III of FIGURE 2.

The deflector plate assembly is placed adjacent a conveyor transfer point to which sheets are brought by an approach conveyor 1 and from which sheets are taken by a second conveyor 2. The conveyors are of the continuous belt type. Conveyor 1 ordinarily operates at a substantially higher speed than conveyor 2. The two conveyors may be a portion of a single sheet classifier or may be embodied in a shearing and piling line in which steel strip is sheared and piled without classification. A plurality of permanent magnets 3 are placed beneath the upper section of the belt of conveyor 1. Pole pieces 4 are provided to distribute the magnetic field evenly and pull sheets downwardly onto the belt. Similar permanent magnets 5 and pole pieces 6 are provided with conveyor 2 some distance beyond the conveyor transfer point. Electromagnets 7 are provided beneath the upper belt of conveyor 2 and may be shifted along the axis of conveyor 2 if desired. Although only a single series of magnets is actually illustrated in FIGURE 2, it will be understood by those who are skilled in the art that the magnets are frequently placed side by side extending across the width of the conveyors.

The deflector plate assembly is supported by two channels 8 whose corners are welded together to form a box structural member. Brackets 9 are welded to the side of the channel structure facing conveyor 2. Two angle sections 10 extend outwardly therefrom above and generally parallel to conveyor belt 2. A cross member 11 supported from brackets 9 carries two gear boxes 12 and 13. Each gear box has an input shaft 14. The input shaft of gear box 12 is connected to handwheel 15 and the input shaft of gear box 13 is connected to an extension shaft 16 which is also connected to a free end of the input shaft 14 of gear box 12. Threaded rods 17 are fitted within gear boxes 12 and 13 for longitudinal movement but not for rotational movement. A worm wheel within each of the gear boxes is threaded to the associated rod 17 and engages a worm pinion formed upon each input shaft. Each of the threaded rods 17 terminates in a clevis 18.

Brackets 19 are welded to the face of the channel structure facing the approach conveyor and have a rod 20 extending therethrough across the width of the assembly. Flat plates 21 and 22 are positioned on either side of the assembly and are pivotally mounted on rod 20 at 23 and 24 respectively. Brackets 25 and 26 are welded to plates 21 and 22 respectively remote from the pivotal mounting points. Clevises 18 are connected to brackets 25 and 26 by pivot rods 27. It will be seen, therefore, that plates 21 and 22 are entirely supported by rod 20 and by pivot rods 27.

Two pillow blocks 28 and 29 are mounted on plates 21 and 22 and have a shaft 30 journaled therein. Shaft 30 is rotatably driven through a coupling 31 from an outside source which is not shown. A crowned magnetic roll 32 is mounted upon shaft 30. Roll 32 is symmetrical, each end being a frustum with the greatest diameter of the roll being at the center section and the smallest diameter being at each end. Roll 32 is held in position by collars 33 fixed on shaft 30.

Two cross members 34 are attached to the lower face of plates 21 and 22 and a plurality of guards 35 extending axially on the conveyors are welded to the lower surface of cross members 34. Each guard 35 has an upwardly turned edge 36.

Two brackets 37 and 38 are attached to the extremities of plates 21 and 22 remote from rod 20, each bracket has a slotted hole 39 formed in it. The holes 39 receive a rod 40 which extends across the axis of the conveyor. Attached to rod 40 is a framework having a forward section 41 and two side sections 42 formed of angle sections. A trailing or rearward section of the framework is formed of two angle pieces 43 at either side and rod 44 which is connected to angle pieces 43. The forward section 41 is bowed downwardly at the center in a manner which is described in greater detail below. The forward and rearward direction of the frame is with reference to travel of the sheets. They first pass by the forward section of the frame and then the rear or trailing section. Thus the leading or forward edge of each sheet will first come adjacent the leading or forward edge of the framework and of the deflector plate which is described below.

A deflector plate generally indicated at 45 is fastened below the framework. It is preferably of stainless steel and it has a leading edge 46, a trailing edge 47, and an edge 48 at each side. The leading edge 46 and angle section 41 are depressed in the center so that deflector plate 45 is bowed downwardly. It generally has the same configuration as the lower surface of magnetic roll 32, as can be best seen in FIGURE 1. The edges 48 at each side are straight as is the trailing edge 47. The apex of the depressed center section of the leading edge 46 is indicated at 49. A cut-away opening is formed in the center of deflector plate 45 the forward portion or apex 50 of the opening is rearwardly of the leading edge 46 and is centrally located. The edges of the opening 51 diverge outwardly from the forwardmost portion and extend rearwardly to trailing edge 47. Two collars 52 fitted on rod 44 are welded to threaded rods 53. Rods 53 extend upwardly through holes in angle brackets 10 and are positioned by nuts 54 threaded on rods 53.

In the operation of the apparatus described above, sheets are delivered by conveyor belt 1 and projected outwardly slightly above conveyor belt 2. Conveyor 2 is at a slightly lower level and the sheets projected outwardly will be slightly above conveyor 2. Conveyor 2 operates at a lower speed than conveyor 1 and the result is to deliver sheets to conveyor 2 more rapidly than they are taken away from the conveyor transfer point. This causes the sheets to be overlapped one upon the other. By repeating the process several times the sheets can readily be slowed down and overlapped such an extent that they will readily fall into a piler. Magnets 3 hold the sheets on conveyor 1 and in the same manner magnets 5 and 7 hold the sheets on conveyor 2. Magnetic roll 32 is provided to maintain the sheets under magnetic control while they are passing from one conveyor to the other. Magnetic roll 32 is crowned in the center so that sheets which are drawn to it will be bowed upwardly and stiffened for projection forward above conveyor 2. Guards 35 prevent sheets from accidently becoming entangled in the mechanism supporting magnetic roll 32 and requires that all sheets pass below the lower surface of the magnetic roll 32 to which they are drawn by magnetic attraction. As each bowed sheet passes beyond magnetic roll 32 its leading end will be drawn downwardly by the magnets underneath conveyor 2. In some instances, the trailing end of the sheet is not pulled down by the magnets, but remains spaced away from the conveyor. Since conveyor 2 is moving more slowly than sheets delivered by conveyor 1 there has been a tendency with conventional apparatus for the trailing end to fold or double up to some degree. This then interferes with a smooth lapping of the following sheet and results in a "cobble." This problem is further accentuated by the fact that the trailing corners of each sheet tend to be carried upwardly about the center section of the sheet due to the configuration of magnetic roll 32. Such bending frequently produces a permanent crease or wrinkle in the sheet. The smaller diameter ends of the magnetic roll carry the trailing corners up while the center section of the sheet is beneath the larger diameter at the crown.

The bowed leading edge of deflector plate 45 corresponds to the bow of magnetic roll 32 and of sheets which are passed under it. It is, however, spaced slightly above roll 32 and sheets which are projected outwardly will ordinarily pass under plate 45 with a very slight clearance or just brushing the plate. The deflector plate gradually flattens toward its trailing edge and will aid in flattening the sheets as they are pulled downwardly onto conveyor belt 2. The opening which is formed in deflector plate 45 commencing just rearwardly of the forward edge of the plate permits air to have access available to an increasingly larger portion of the sheet. The opening prevents a vacuum or low pressure area from being formed between the plate and permits the sheets to be readily drawn downwardly to the conveyor. It also prevents undesirable upward movement of the rear corners of the sheet and avoids "cobbling" by reason of the sheets being doubled or folded.

The precise elevation of the magnet roll may be varied from time to time as desired by rotation of handwheel 15. The elevation of the other end of the deflector plate can likewise be adjusted by nuts 54.

From the foregoing, it will be seen that I have invented new and useful means which permit handling of sheets at substantially higher speeds than has heretofore been practical. It is likewise possible to avoid damage to the sheets and produce a higher percentage of salable product.

While I have illustrated and described a present preferred embodiment of my invention, it is to be understood that I do not limit myself thereto and that the invention may be otherwise variously practiced within the scope of the following claims.

I claim:

1. In sheet handling means having a conveyor transfer point at which sheets are transferred from a first conveyor to a second conveyor, means for transferring sheets therebetween comprising magnetic roll means above the sheet pass line in position to attract and bow sheets in the course of transfer and deflector plate means spaced beyond said roll means having a lower surface spaced above said second conveyor, said plate means having an upwardly concave lower surface adjacent said roll means and an enlarged opening formed in the center portion of said plate.

2. In sheet handling means having a transfer point at which sheets are transferred from a first conveyor to a second conveyor, means for transferring the sheets therebetween comprising magnetic roll means positioned above the sheet pass line whereby sheets being transferred are attracted thereto, said roll means having tapered ends, and a deflector plate spaced beyond sheet roll means and above said second conveyor, the forward corners of the plate being turned upwardly, said deflector plate having an opening formed in its center portion and extending rearwardly therefrom.

3. In sheet handling means having a conveyor transfer point at which sheets are transferred from a first conveyor to a second conveyor, means for transferring sheets between said conveyors comprising tapered magnetic roll means above the sheet pass line, a plate-like deflector member which is V-shaped in plane positioned beyond said roll means and having upwardly turned corners at the leading edge whereby the sheets delivered from the first conveyor are maintained in proximity to the second conveyor for uninterrupted delivery thereto.

4. In sheet handling means having a conveyor transfer point at which sheets are transferred from a first conveyor to a second conveyor, magnet means for holding sheets to the first conveyor and magnet means for holding sheets to the second conveyor, means for transferring sheets between said conveyors comprising magnetic roll means above the sheet pass line, said roll means having tapered ends, whereby sheets are bowed on their longitudinal axes by the roll means, and deflector plate means spaced slightly above the pass line of sheets projected outwardly from said roll means, the lower surface of said reflector plate being bowed upwardly about the longitudinal axes of the sheets at its leading edge, said deflector plate having a notch-shaped opening at its rearward edge extending to a substantial width of the rearward edge.

5. A deflector plate for sheet handling apparatus comprising a flat plate-like member spaced above a sheet receiving conveyor in position to guide and restrain sheets delivered thereto, said member having its forward corners turned upwardly and having an opening formed therein beginning rearwardly of the leading edge of the plate-like member and diverging rearwardly and outwardly to the rear edge of the plate-like member.

6. A deflector plate for sheet handling apparatus comprising a flat plate-like member spaced above a sheet receiving conveyor whereby sheets delivered to said conveyor are guided and restrained by said member, said member having a leading edge transverse to the direction of sheet travel, the outer corners of said leading edge being flared upwardly and imparting a downwardly bowed line to said leading edge, said member also having an opening formed therein commencing rearwardly of the leading edge and rearwardly and outwardly.

7. A deflector plate for sheet handling apparatus comprising a flat plate-like member spaced above and extending over a sheet receiving conveyor having an elongated sheet receiving surface, said member being in position to guide and restrain sheets delivered to said conveyor, said member having a forward edge transverse to the direction of sheet travel, said member being imperforate at its forward edge and having an opening beginning behind the forward edge and extending rearwardly to the trailing edge of said member.

8. Deflector means for sheet handling apparatus comprising a flat plate-like member spaced above a sheet receiving conveyor whereby sheets delivered to said conveyor are guided and restrained by said member, said member having a forward edge transverse to the direction of sheet travel and bowed downwardly, said member having an opening formed rearwardly thereof and diverging outwardly to the rearward edge of said member, and vertically adjustable means supporting said member whereby said member may be vertically adjusted.

9. In combination, sheet handling apparatus comprising first sheet conveyor means which bring sheets to a conveyor transfer point and second sheet conveyor means which take them away therefrom, magnetic roll means positioned adjacent the sheet transfer point above said conveyor means, and deflector plate means positioned adjacent and slightly above the lower surface of said roll means and extending in spaced relation above second said conveyor means, the center of said deflector plate means being bowed downwardly at its forward edge and having an opening in the plate rearwardly thereof which diverges to the trailing edge thereof.

10. In combination, sheet handling apparatus comprising first sheet conveyor means which bring sheets to a conveyor transfer point and second sheet conveyor means which take them away therefrom, magnetic roll means mounted on vertically adjustable bracket means adjacent the sheet transfer point above said conveyor means and deflector plate means positioned adjacent and slightly above the lower surface of said roll means and extending in spaced relation above second said conveyor means, said deflector plate means being bowed downwardly at its forward edge and having an opening in the plate rearwardly thereof which diverges to the trailing edge thereof, the forward edge of said deflector plate means being mounted on said bracket means, and means supporting the rearward edge of said plate means.

References Cited in the file of this patent

UNITED STATES PATENTS

| 281,754 | Crowell | July 24, 1883 |
| 1,173,193 | Kimball | Feb. 29, 1916 |
| 2,897,952 | Buccicone | Aug. 4, 1959 |